United States Patent
Bolton et al.

[11] Patent Number: 5,846,420
[45] Date of Patent: *Dec. 8, 1998

[54] FILTER BACKFLUSHING SYSTEM USING PISTON ARRANGEMENT WITH CONNECTED CHAMBERS

[75] Inventors: Joseph A. Bolton, Queensbury; Peter T. Carstensen, Adirondack, both of N.Y.

[73] Assignee: Thermo Fibertek Inc., Waltham, Mass.

[*] Notice: The term of this patent shall not extend beyond the expiration date of Pat. No. 5,374,351.

[21] Appl. No.: 356,854

[22] Filed: Dec. 15, 1994

Related U.S. Application Data

[63] Continuation-in-part of Ser. No. 97,551, Jul. 27, 1993, Pat. No. 5,374,351.

[51] Int. Cl.$^6$ ................................. B01D 29/66
[52] U.S. Cl. .................... 210/411; 55/301; 210/108; 210/412; 417/533
[58] Field of Search ................. 210/87, 90, 97, 210/106, 108, 136, 258, 393, 411, 412, DIG. 5, 321.69, 333.01, 333.1; 55/283, 301, 302, 303; 417/533

[56] References Cited

U.S. PATENT DOCUMENTS

| | | |
|---|---|---|
| 191,131 | 5/1877 | Gainey ................................... 210/411 |
| 582,442 | 5/1897 | Stifel ..................................... 210/108 |
| 2,338,419 | 1/1944 | Forrest et al. . |
| 3,029,948 | 4/1962 | McKay . |
| 3,221,888 | 12/1965 | Muller . |
| 3,365,065 | 1/1968 | Varjabedian . |
| 3,389,797 | 6/1968 | Giardini . |
| 3,425,557 | 2/1969 | Rosaen . |
| 3,425,558 | 2/1969 | Rosaen . |
| 3,542,197 | 11/1970 | Rosaen . |
| 3,554,380 | 1/1971 | Karpacheva et al. . |
| 3,870,638 | 3/1975 | Karpacheva et al. . |
| 4,055,500 | 10/1977 | Parker . |
| 4,156,651 | 5/1979 | Mehoudar . |
| 4,642,188 | 2/1987 | DeVisser et al. ...................... 210/411 |
| 4,648,971 | 3/1987 | Pabst . |
| 4,704,210 | 11/1987 | Boze et al. ............................. 210/778 |
| 4,708,801 | 11/1987 | Galaj . |
| 4,770,771 | 9/1988 | Buckminster ......................... 210/108 |
| 4,776,962 | 10/1988 | Wakeman .............................. 210/411 |
| 4,861,498 | 8/1989 | Robinsky . |
| 4,874,533 | 10/1989 | Boze et al. ............................. 210/778 |
| 4,943,379 | 7/1990 | Boze et al. ............................. 210/778 |
| 4,957,625 | 9/1990 | Katoh et al. ........................... 210/411 |
| 5,047,154 | 9/1991 | Comstock et al. ................. 210/321.69 |
| 5,128,107 | 7/1992 | Katoh et al. ........................... 210/411 |
| 5,141,631 | 8/1992 | Whitman ................................ 210/411 |
| 5,234,605 | 8/1993 | Reipur et al. .......................... 210/411 |
| 5,374,351 | 12/1994 | Bolton et al. ............................. 210/97 |
| 5,401,397 | 3/1995 | Moorehead ............................ 210/108 |
| 5,512,167 | 4/1996 | Gramms et al. ....................... 210/412 |

FOREIGN PATENT DOCUMENTS

| | | | |
|---|---|---|---|
| 2091451 | 7/1982 | United Kingdom | ................. 210/411 |

OTHER PUBLICATIONS

Webster's Third New International Dictionary—Merriam—Webster Inc., Publishers, Copywright 1986, pp. 1724,1745.

*Primary Examiner*—Joseph W. Drodge
*Attorney, Agent, or Firm*—Kane, Dalsimer, Sullivan, Kurucz, Levy, Eisele and Richard, LLP

[57] ABSTRACT

The piston arrangement includes one or more pistons, each propelled by a pneumatic actuator. Alternately, an accumulator-type actuator may be used, wherein compressed gas is inputted directly into the backflushing fluid chamber to reverse fluid flow through the filter arrangement.

4 Claims, 5 Drawing Sheets

FILTER BACKFLUSHING SYSTEM USING PISTON ARRANGEMENT WITH CONNECTED CHAMBERS

This patent application is a continuation-in-part of my previous U.S. patent application Ser. No.: 08/097,551, filed Jul. 27, 1993, now U.S. Pat. No. 5,374,351, entitled FILTER BACKFLUSHING SYSTEM.

FIELD OF THE INVENTION

The present invention relates to a filtering system and, more particularly, to a filter backflushing system for removing contaminants from a filter arrangement. The backflushing system includes a backflushing fluid chamber incorporating a piston arrangement, air chamber or accumulator therein for providing a high intensity, substantially instantaneous, constant pressure reverse flow through the filter arrangement.

BACKGROUND OF THE INVENTION

A filtered supply of a coolant, lubricant, fuel, water or other fluid is oftentimes essential for the proper operation and maintenance of a plethora of industrial, automotive and commercial systems. Unfortunately, the filter elements utilized to filter such fluids must be periodically replaced or cleansed to remove a clogging accumulation of contaminants and foreign matter therefrom.

The periodic removal and replacement of a clogged filter element generally requires the shutting down of an associated system during the replacement procedure. The expensive, nonproductive downtime of the system, the replacement cost of the filter element and the expenses incurred to properly dispose of the soiled filter element in accordance with the ever increasing degree of governmental and environmental mandates, have led to the development of numerous in situ filter element cleansing systems.

One such system, generally termed backflushing or backwashing, utilizes a reverse flow of fluid to dislodge contaminants from a filter element. Advantageously, backflushing reduces the operational cost of a filtering system by extending the usable life of the filter elements, by reducing the system downtime required to replace filter elements, and by reducing disposal costs. Notwithstanding the above-described advantages, currently available backflushing systems are not capable of producing a reverse flow of fluid having sufficient flow rate, velocity and pressure drop to remove substantially all of the contaminants from a filter element, especially when the fluid is highly viscous or has a high solids content and the filter elements have fine filtration ratings of 150 microns or less.

SUMMARY OF THE INVENTION

In order to avoid the disadvantages of the prior art, the present invention provides a filter backflushing system incorporating a piston arrangement, an air chamber, or an accumulator, to provide a short duration, high intensity, constant pressure reverse backflushing flow through a filter arrangement.

The filter backflushing system of the present invention generally includes a filter housing for enclosing a removable filter arrangement, a valve controlled feed pipe for introducing an unfiltered fluid into the filter housing, an output feed pipe for removing filtered fluid from the filter housing, a valve-controlled drain output for removing backflushing fluid from the filter housing, a backflushing fluid chamber for receiving the filtered fluid from the output feed pipe, a backflushing actuator for propelling the filtered fluid contained within the backflushing fluid chamber in a reverse direction through the filter arrangement, a valve-controlled accepts port for removing the filtered fluid from the backflushing fluid chamber, and a fluid pressure responsive system for initiating the backflushing operation.

In a first embodiment of the present invention, the filter backflushing system incorporates a coalescing filter arrangement for extracting oil from an oil and water mixture. As known in the art, coalescing filters are commonly utilized to separate oil or other liquids from water, although they may be utilized to separate any two liquids, as long as there is a difference in specific gravities and one liquid is much greater in volume than the other.

As the oil and water mixture passes through the very small pores of the coalescing filter arrangement, fine droplets of oil collect on the outer surface thereof, thereby forming larger droplets of oil. The minimal turbulence within the filter housing and the low velocity of the oil droplets allow the droplets of oil to float upwards to the surface of the water, due to the difference in specific gravity of the two fluids, where they bleed out at a constant flow or are purged at intervals.

A coalescing filter arrangement typically has a filtration rating of ten (10) microns or less. As such, a coalescing filter arrangement is highly susceptible to plugging. Generally, to reduce any operational clogging due to an accumulation of contaminants, one or more fine filter elements must be installed ahead of or in series with the coalescing filter arrangement. When the coalescing filter arrangement does eventually becomes plugged, it must be replaced or backflushed as described above. The present invention provides an improved filter backflushing system which is highly suited for effectively and efficiently removing contaminants from coalescing filter arrangements, although it may be incorporated into virtually any type of filtration system.

The coalescing filter backflushing system includes a filter housing for removably enclosing a coalescing filter arrangement, and a pneumatically-driven piston arrangement for propelling a quantity of filtered water, contained in a backflushing fluid chamber, in a reverse direction through the coalescing filter arrangement.

The filter backflushing system further includes a feed pipe for introducing a supply of the unfiltered oil and water mixture into the interior of the coalescing filter arrangement, an oil removal system for collecting the oil which separates from the oil and water mixture during the filtration process, an output feed pipe for directing the filtered water from the filter housing into the backflushing fluid chamber, and a drain output for removing backflushing fluid from the filter housing.

The backflushing fluid chamber includes a pneumatically-driven piston arrangement, including at least one piston, for propelling a supply of filtered water, temporarily stored within the backflushing fluid chamber, through the coalescing filter arrangement during a backflushing operation. Preferably, the volume of the backflushing fluid chamber is substantially equivalent to, or greater than, the volume of the filter housing, thus allowing the clean, filtered water contained within the backflushing fluid chamber to completely displace the fluid within the filter housing (filtered water and oil and water mixture) during the backflushing procedure, removing substantially all of the flow reducing contaminants and foreign matter clogging the coalescing filter arrangement. Further, the backflushing fluid chamber includes an input port for receiving the filtered water from the filter housing output feed pipe and an accepts port for removing the filtered water from the backflushing filter system. Under normal operational conditions, the filtered water is adapted to flow through the filter housing output pipe, through the backflushing fluid chamber, exiting through the accepts port.

The pneumatically-driven piston arrangement is adapted to provide a rapid, high intensity, constant pressure reverse flow of fluid through the coalescing filter arrangement, or a series of rapid, high intensity fluid pulsations therethrough. In particular, when utilizing a single piston, the piston arrangement includes a pneumatic cylinder which extends into the backflushing fluid chamber. A piston head is attached to an end of the pneumatic cylinder, and is disposed within the interior of the backflushing fluid chamber. Preferably, the diameter of the piston head is substantially equivalent to the interior diameter of the backflushing fluid chamber. In response to the application of an appropriate degree of air pressure to the pneumatic cylinder, the piston head is displaced rapidly longitudinally through the backflushing fluid chamber, thereby propelling the filtered water contained within the chamber in a reverse direction through the filtering system.

The piston arrangement produces a high, constant fluid pressure within the filter backflushing system which effectively backflushes the coalescing filter arrangement, unlike the ineffectual backflushing systems of the prior art which utilize a large, inconsistent, low pressure reverse backflushing flow. Advantageously, the backflushing flow may be regulated in accordance with the requirements of the filter, the types of fluids flowing through the filtration system or other parameters. For example, the backflushing flow intensity may be regulated by controlling the air pressure supplied to the pneumatic cylinder, by varying the piston stroke velocity, and/or by altering the relative diameters of the pneumatic cylinder, piston head and backflushing fluid chamber.

In accordance with the present invention, the backflushing procedure commences in response to a predetermined reduction of the flow of the oil and water mixture through the coalescing filter arrangement. Alternately, the coalescing filter arrangement may be backflushed at predetermined intervals or in response to other system conditions. Preferably, a differential pressure switch is provided for determining the relative fluid pressures between the unfiltered oil and water mixture flowing into the filter housing through the feed pipe and the filtered water flowing out of the filter housing through the output feed pipe. When the difference between the fluid pressures reaches a predetermined threshold, the pneumatically-driven piston is forced longitudinally through the backflushing fluid chamber, thereby forcing the filtered water stored within the chamber in a reverse direction through the coalescing filter arrangement. Alternatively, a flowmeter or the like, for measuring the flow of filtered water through the output feed pipe or other appropriate location within the filtration system, may be utilized to determine a low flow condition and to initiate the backflushing operation.

The direction of fluid flow through the filter backflushing system of the present invention is ingeniously controlled by a plurality of suitably positioned pneumatic control valves. Specifically, the feed pipe for inputting the oil and water mixture into the interior of the coalescing filter arrangement, the accepts port for removing the filtered water from the filtration system and the drain output for removing backflushing fluid from the filter housing, each include a pneumatic control valve which is adapted to selectively shut off or enable the flow of fluid therethrough during the normal filtering and backflushing operation of the filter backflushing system. Of course, other suitable types of control valves may be utilized to regulate the fluid flow through the filter backflushing system of the present invention.

During filtration, the feed pipe control valve is in an open state, thereby allowing the oil and water mixture to be separated by the coalescing filter arrangement. The droplets of oil which form on the outer surface of the coalescing filter arrangement float to the top of the filter housing where they are purged or discharged in any manner known in the art. The filtered water, having a higher specific gravity than the oil, enters the backflushing fluid chamber after passing through the output feed pipe disposed proximate the bottom of the filter housing. Further, by maintaining the drain output control valve and the accepts port control valve in a closed and open state respectively, the filtered water flows out of the backflushing fluid chamber through the accepts port. This filtration process continues until the differential pressure switch is triggered in response to the clogging of the coalescing filter arrangement, subsequently initiating the filter backflushing operation.

The direction of fluid flow is reversed through the coalescing filter arrangement during the backflushing operation. First, the accepts and feed pipe control valves are closed in rapid succession. Next, pressurized air is supplied to the pneumatic cylinder, forcing the piston head longitudinally through the backflushing fluid chamber, thereby pressurizing the filter backflushing system. The drain output control valve is then opened, allowing the backflushing fluid to be purged from the filter housing after flowing through the coalescing filter arrangement in a reverse direction. Once the pneumatic cylinder reaches the end of its stroke, it is forced to its original position with a quantity of pressurized air. Finally, the drain output control valve is closed and the feed pipe and accepts port control valves are reopened, returning the filtration system to its normal filtering condition.

A valve controlled external supply of hot water, detergent, or other appropriate cleaning fluid may be utilized during the backflushing operation described above. Specifically, the external fluid may be inputted into the backflushing fluid chamber through the filter housing output feed pipe, backflushing fluid chamber accepts port or other suitable location in the filter backflushing system during the initial stages of the backflushing operation.

The filter backflushing system of the instant invention may be utilized to remove contaminants and foreign matter from a wide variety of filters. For example, in a second embodiment of the present invention, the backflushing system is utilized to cleanse an ultra fine filter arrangement. Unlike the outward fluid flow utilized by the coalescing filter arrangement described above, ultra fine filters require an inward fluid flow. As such, in the second embodiment of the present invention, the unfiltered fluid is introduced directly into the filter housing rather than into the interior of the filter arrangement. During the filtration process, the unfiltered fluid flows through the ultra fine filter to the interior thereof where it subsequently flows into the backflushing fluid chamber through an output feed pipe.

The filter backflushing system may utilize backflushing actuators other than the above-described pneumatically-driven piston, if they are capable of providing a high intensity, substantially instantaneous, constant pressure reverse flow through the filter arrangement as required by the present invention. For example, a plurality of pistons may be strategically arranged to create the required flow of backflushing fluid through a filter arrangement. Further, an accumulator-type actuator may be utilized, in which compressed air is inputted directly into the backflushing fluid chamber to reverse the flow of fluid through the filter arrangement. Alternately, a piston propelled by a spring or other appropriate driving means may be incorporated into the present invention.

BRIEF DESCRIPTION OF THE DRAWINGS

These and other features of the present invention will become readily apparent upon reading the following detailed description of the invention in conjunction with the accompanying drawings, in which.

DETAILED DESCRIPTION OF THE INVENTION

Referring now specifically to the drawings, there are illustrated several embodiments of a filter backflushing system according to the present invention, wherein like reference numerals refer to like parts throughout the drawings.

Figure 1:
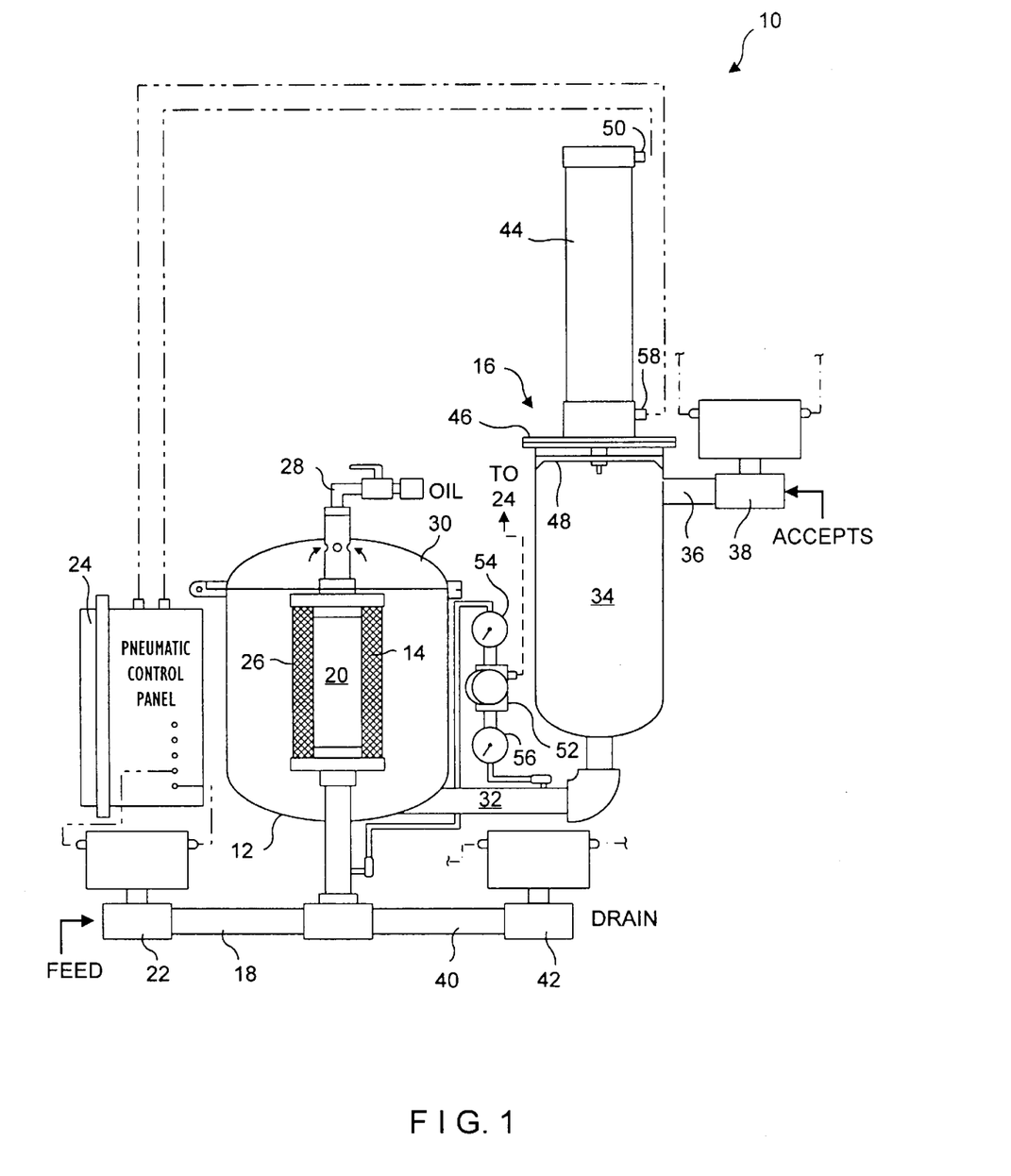
FIG. 1 illustrates a coalescing filter backflushing system for filtering an oil and water mixture according to the present invention.

As illustrated in detail in FIG. 1, the coalescing filter backflushing system, generally designated as 10, includes a filter housing 12 enclosing a removable coalescing filter arrangement 14, and a pneumatically-driven piston 16 for creating a reverse flow through the filter arrangement 14.

A feed pipe 18 is utilized to introduce a supply of an unfiltered oil and water mixture into the interior 20 of the coalescing filter arrangement 14. A pneumatic valve 22 is utilized to selectively disable or enable the flow of the oil and water mixture through the feed pipe 18 in accordance with a supply of pressurized air provided by a pneumatic control panel 24. As the oil and water mixture passes through the coalescing filter arrangement 14, droplets of oil float upwards toward the top of the filter housing 12, after forming on the exterior surface 26 of the filter arrangement 14. An oil removal system 28, disposed on the pivotable cover 30 of the filter housing 12, is utilized to remove the separated oil from the filter housing.

The filtered water flows out of the bottom of the filter housing 12, through an output feed pipe 32, into a backflushing fluid chamber 34. During normal filtration, an accepts port 36 is maintained in an open state by a pneumatic valve 38, thereby allowing the filtered water to flow out of the backflushing fluid chamber 34 where it is suitably discarded, recycled or otherwise utilized.

The pneumatically-driven piston 16 is designed to propel the filtered water contained in the backflushing fluid chamber 34 through the output feed pipe 32, into the filter housing 12 and through the coalescing filter arrangement 14 in a reverse direction, wherein the backflushing fluid and the contaminants suspended therein which have been dislodged from the filter arrangement 14 flow out of the backflushing system through the drain output 40. Again, a pneumatic valve 42 is provided for controlling the flow of fluid through the drain port 40 in response to pressurized air supplied by the pneumatic control panel 24.

The pneumatically-driven piston 16 includes a pneumatic cylinder 44 which is slidably received through the top 46 of the backflushing fluid chamber 34. A piston head 48 is suitably secured to the bottom of the pneumatic cylinder 44. During a backflushing operation, the piston head 48 is rapidly displaced longitudinally within the backflushing fluid chamber 34 in response to the application of pressurized air, supplied by the pneumatic control panel 24 to an air input port 50 disposed proximate the top of the pneumatic cylinder 44, thereby driving the filtered water contained within the chamber 34 in a reverse direction through the coalescing filter arrangement 14 and the drain port 40.

The backflushing operation is initiated in response to a predetermined reduction in the flow of the oil and water mixture through the coalescing filter arrangement 14, as determined by a differential pressure (D/P) switch 52. Preferably, the differential pressure switch 52 is used to determine the D/P across the filter arrangement. When the relative fluid pressures reach a predetermined threshold, the differential pressure switch 52 is activated and a backflushing initiation signal is subsequently relayed to the pneumatic control panel 24, thereby initiating the filter backflushing operation.

Pneumatic valves 22, 38 and 42 provide the proper fluid paths through the filter backflushing system of the present invention in response to pressurized air supplied by the pneumatic control panel 24 during both normal filtration and the filter backflushing operation.

During filtration, pneumatic valves 22 and 38 are maintained in an open state, while pneumatic valve 42 is closed, thereby creating a fluid path through feed pipe 18, coalescing filter arrangement 14, output feed pipe 32, backflushing fluid chamber 34 and accepts port 36. The filtration fluid path is maintained until the differential pressure switch 52 is activated in response to the clogging of the coalescing filter arrangement 14. Upon the activation of the differential pressure switch 52, the pneumatic control panel 24 initiates a backflushing operation.

During the backflushing operation, the fluid flow through coalescing filter arrangement 14 is reversed. Specifically, upon activation of the differential pressure switch 52, the pneumatic control panel 24 closes the accepts port pneumatic valve 38 and the feed pipe pneumatic valve 22 in rapid succession. Next, pressurized air is supplied by the pneumatic control panel 24 to air input port 50, disposed proximate the top of pneumatic cylinder 44, rapidly driving the piston head 48 longitudinally through the backflushing fluid chamber 34 and pressurizing the filter backflushing system 10. Substantially instantaneously thereafter, the drain output pneumatic valve 42 is opened, allowing the filtered water previously contained within the backflushing fluid chamber 34 to flow rapidly through the coalescing filter arrangement 14 in a reverse direction, where it is subsequently purged from the filter housing 12 through drain port 40 after dislodging the clogging contaminants from the filter arrangement. After reaching the end of its backflushing stroke, the pneumatic cylinder 44 is returned to its original position in response to the application of pressurized air to the air input port 58. Finally, the drain output pneumatic valve 42 is closed and the feed pipe and accepts port pneumatic valves 22, 38 are reopened, returning the filtration system to a filtering operation.

Figure 2:
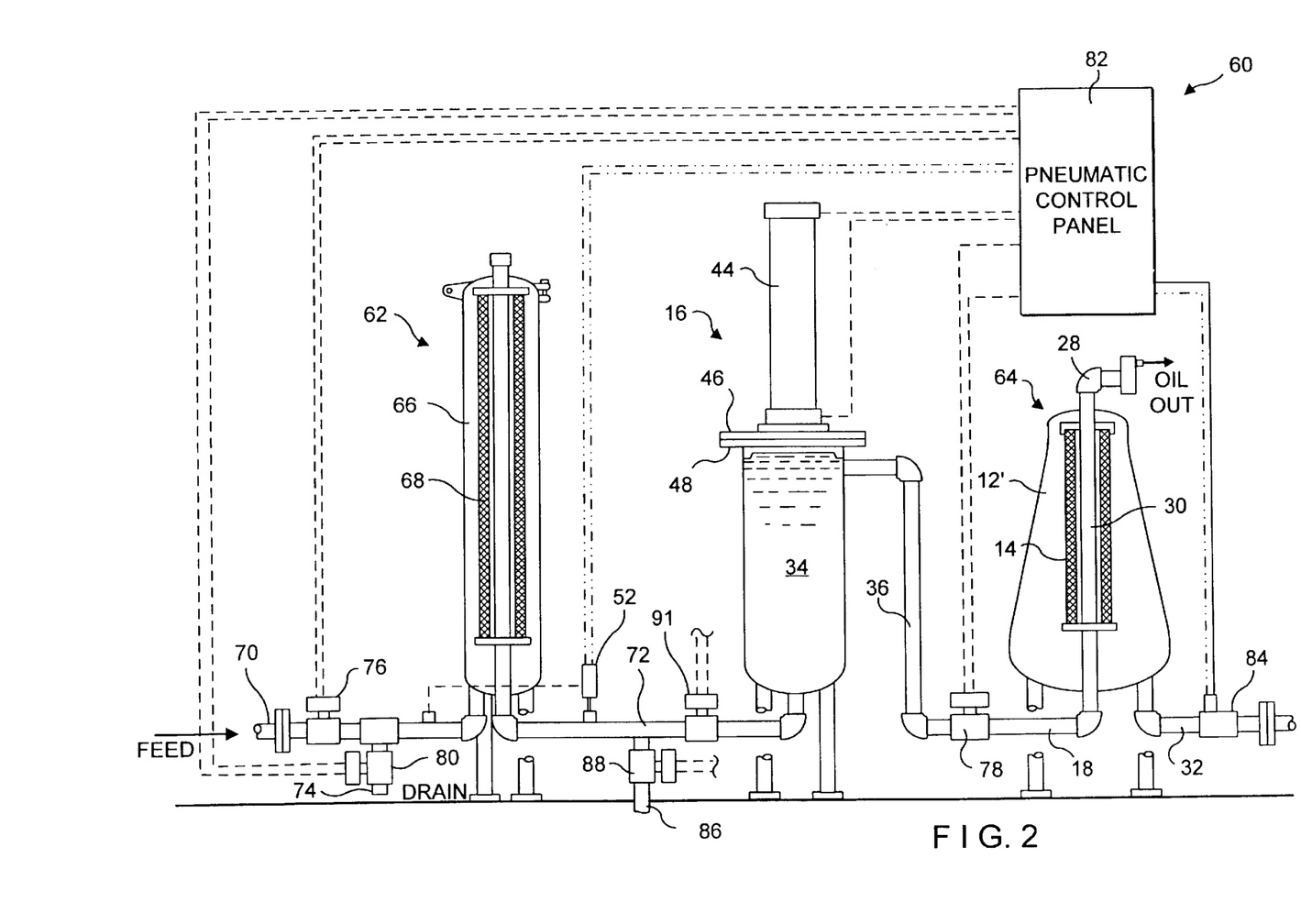
FIG. 2 illustrates a filter backflushing system having a fine pre-filtering system and a coalescing filtration system arranged in series.

Referring now specifically to FIG. 2, there is illustrated a filter backflushing system, generally designated as 60, having a fine pre-filtering system 62 for removing contaminants from an oil and water mixture, and a coalescing filtration system 64 for separating the oil from the filtered oil and water mixture. A pneumatically-driven piston 16 is utilized to propel the filtered oil and water mixture contained in a backflushing fluid chamber 34 in a reverse direction through the fine pre-filtering system 62.

The fine pre-filtering system 62 includes a filter housing 66 for removably enclosing a fine pre-filter arrangement 68, a feed pipe 70 for introducing the contaminated oil and water mixture into the filter housing 66, an output feed pipe 72 for removing the filtered oil and water mixture from the interior of the fine pre-filter arrangement 68, a drain port 74 for purging backflushing fluid from the filter housing 66 and a backflush valve 91. During normal filtration, the filtered oil and water mixture flows from the interior of the fine pre-filter arrangement 68 into the coalescing filtration system 64, through a backflushing fluid chamber 34.

As in the previously-described embodiment of the present invention, the coalescing filtration system 64 includes a filter housing 12' for enclosing a coalescing filter arrangement 14, a feed pipe 18 for directing the filtered oil and water mixture flowing out of the backflushing fluid chamber 34 into the interior 20 of the coalescing filter arrangement 14, an oil removal system 28 for removing the separated oil from the filter housing 12', and an output feed pipe 32 for removing filtered water from the filter housing.

Advantageously, the filter housing 12' is substantially pear-shaped, unlike the cylindrical configuration of filter housing 12. In particular, by forming the filter housing 12' in a substantially pear-shaped configuration, the turbulence and flow velocities within the filter housing are reduced, thereby facilitating the separation of the oil from the filtered oil and water mixture.

Again, as previously described, the pneumatically-driven piston 16 includes a pneumatic cylinder 44 and a piston head 48. During a backflushing operation, the piston head 48 is rapidly displaced longitudinally within the backflushing fluid chamber 34 in response to the application of pressurized air supplied by a pneumatic control panel 82, thereby driving the filtered oil and water mixture contained within the chamber 34 in a reverse direction through the fine pre-filter arrangement 68. After passing through the pre-filter arrangement 68 in a reverse direction, the backflushing fluid is purged from the filtering system through drain port 74.

A plurality of pneumatically operated ball valves 76, 78, 80 and 91, each controlled by pressurized air supplied by the pneumatic control panel 82, are utilized to control the direction of fluid flow through the fine pre-filtering system 62.

During the filtering operation, the feed pipe ball valve 76, the accepts port ball valve 78 and the backflush valve 91 are maintained in an open state, while the drain port ball valve 80 is maintained in a closed state. As such, a fluid path is created which extends from the feed pipe 70 to the accepts port 32 through the fine pre-filter arrangement 68, the backflushing fluid chamber 34 and the coalescent filter arrangement 14. This fluid path is maintained by the pneumatic control panel 82 until the differential pressure switch 52 is activated in response to the unacceptable clogging of the fine pre-filter arrangement 68. Alternatively, or in conjunction with the differential pressure switch 52, an accepts port flowmeter 84 may be utilized to indicate a low flow condition.

In response to the activation of the differential pressure switch 52, the pneumatically-driven piston 16 provides a high intensity, substantially instantaneous, constant pressure reverse flow through the fine pre-filter arrangement 68. In particular, upon activation of the differential pressure switch 52, the pneumatic control panel 82 closes the accepts port ball valve 78, the feed pipe ball valve 76 and the backflush valve 91 in order. Next, the drain valve 74 is opened for a short period of time to drain the liquid from the filter housing 66 before backflushing. Once the housing 66 is drained, the backflush valve 91 is opened. Air pressure is utilized to rapidly propel the piston head 48 through the backflushing fluid chamber 34, forcing the backflushing fluid to flow rapidly, and at a high intensity, through the fine pre-filter arrangement 68 in a reverse direction, where it is subsequently purged through the drain port 74 after dislodging the clogging contaminants from the filter arrangement 68. After reaching the end of its backflushing stroke, the pneumatic cylinder 44 is returned to its original position. Finally, the drain output ball valve 80 is closed and the feed pipe, accepts port and backflush valves 76, 78 and 91, respectively, are opened, initiating filtration. In this embodiment of the invention, the filtration rating of the fine pre-filter arrangement 68 is similar to the filtration rating of the coalescing filter arrangement 14. As such, the fine pre-filter arrangement will remove substantially all of the contaminants from the oil and water mixture, reducing the resultant clogging of the coalescing filter arrangement. However, if desired, a second backflushing system may be utilized to backflush the coalescing filter arrangement. Further, a single, properly valved backflushing system may be utilized to simultaneously backflush both the fine pre-filter arrangement 68 and the coalescing filter arrangement 14.

Under certain circumstances, it is often desirable to utilize an external supply of hot water, detergent, or other appropriate cleaning fluid during the backflushing operation described above. As further illustrated in FIG. 2, the present invention includes an external fluid supply 86 and an associated pneumatically operated ball valve 88, for inputting a cleaning fluid into the backflushing fluid chamber during the backflushing operation.

Figure 3:
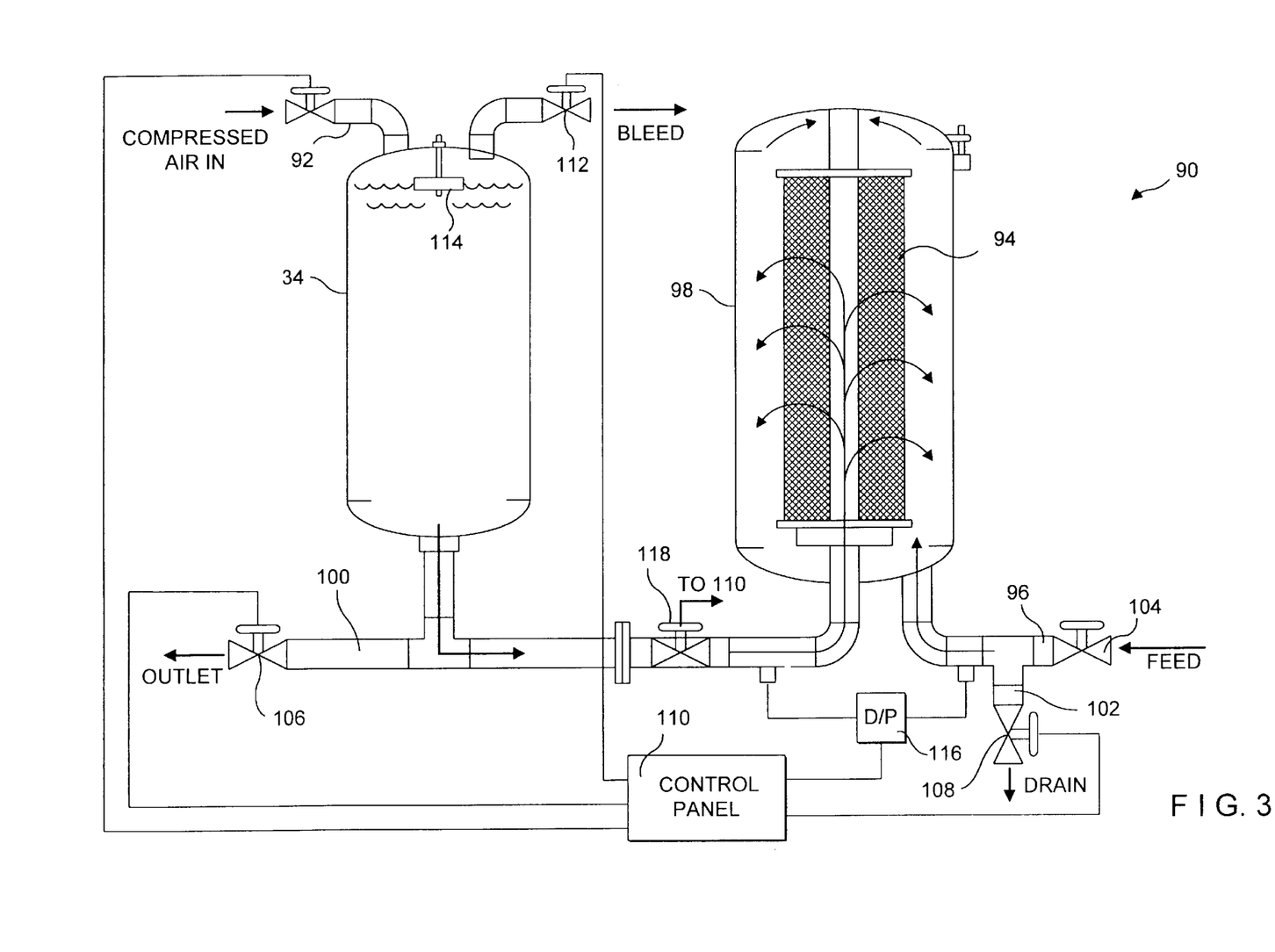
FIG. 3 illustrates a filtration system having a compressed air backflushing system.

Referring now to FIG. 3, there is illustrated a filter backflushing system, generally designated as 90, according to yet another embodiment of the present invention. The filter backflushing system 90 utilizes a compressed gas, supplied through a compressed gas feed pipe 92, to propel the filtered fluid contained in a backflushing fluid chamber 34 in a reverse direction through a filter arrangement 94. Alternately, a piston may be utilized as described above to provide the reverse flow of fluid through the filter arrangement.

The filter backflushing system 90 includes a feed pipe 96 for inputting a contaminated fluid into a filter housing 98, an outlet feed pipe 100 for removing filtered fluid from the filter backflushing system, a drain port 102 for purging backflushing fluid from the filter housing, and a plurality of pneumatically controlled valves 104, 106, 108, each actuated by a pneumatic control panel 110, for controlling the flow of fluid through the feed pipe, outlet feed pipe and drain port, respectively. A backflushing valve 118 is also utilized as detailed hereinbelow. During normal filtration, the drain valve 108 is maintained in a closed state and the feed, outlet and backflushing valves 104, 106 and 118 are maintained in an open state, thereby creating a fluid flow path through the filter arrangement 94 from the feed pipe 96 to the outlet feed pipe 100.

Prior to the initiation of the filter backflushing sequence, and in response to the opening of a bleed valve 112, the backflushing fluid chamber 34 is filled with a supply of the filtered fluid exiting the filter housing 98. As illustrated, the bleed valve 112 is disposed proximate the top of the backflushing fluid chamber 34 and is actuated by the pneumatic control panel 110. The filtered fluid fills the backflushing fluid chamber 34 until the fluid level hits a float switch 114, resulting in the closure of the bleed valve 112.

A differential pressure switch 116 is provided for determining the differential pressure across the filter arrangement 94, as measured between the input and output of the filter housing 98. When the differential pressure across the filter arrangement reaches a predetermined maximum value, a backflushing operation is initiated.

During the initial stages of the backflushing operation, the outlet, feed and backflushing valves 106, 104, 118 are closed in rapid order. Next, approximately 70 to 400 psi of a compressed gas such as air or the like is delivered directly into the backflushing fluid chamber through the compressed gas feed pipe 92, thereby pressurizing the backflushing fluid system 90. Next, the drain valve 108 is opened allowing the fluid in the filter housing 98 to drain from the system, reducing any backflushing or flow resistance during backflushing. Once the filter housing 98 has drained, the backflushing valve 118 is opened causing the filtered fluid contained within the backflushing fluid chamber 34 to flow rapidly through the filtering arrangement 94 in a reverse direction, where it is subsequently purged through the drain port 102 along with any contaminants dislodged from the filter arrangement 94. Thereafter, in order to reinitiate filtration, the compressed gas feed pipe 92 and the drain valve 108 are closed, while feed, outlet and backflushing valves 104, 106 and 118 are reopened.

Figure 4:
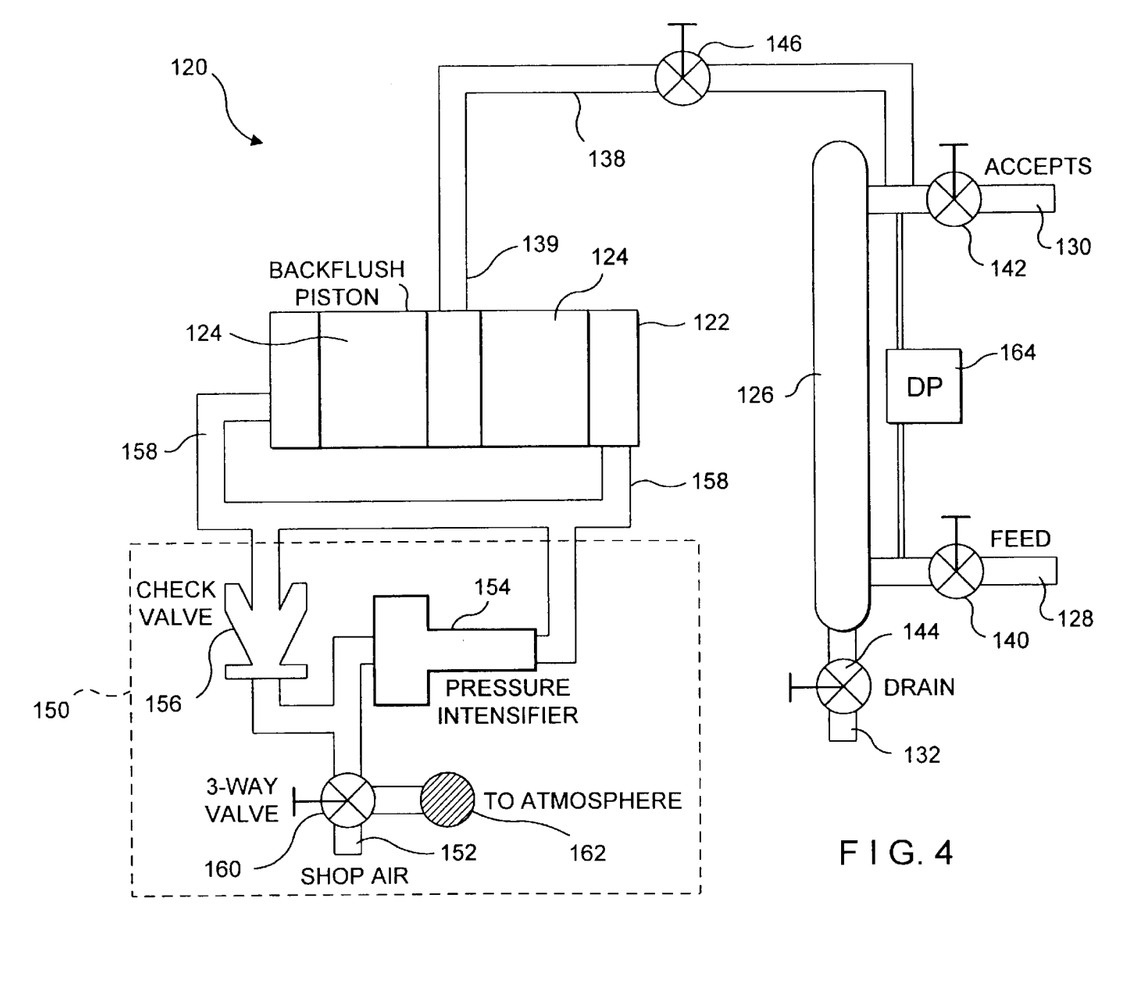
FIG. 4 illustrates yet another embodiment of a filter backflushing system in accordance with the present invention.

A further embodiment of a filter backflushing system in accordance with the present invention, generally designated as 120, is illustrated in FIG. 4. The filter backflushing system 120 utilizes a backflush piston arrangement 122, preferably incorporating dual pistons, to propel a supply of a filtered fluid, contained within a backflushing fluid chamber 124, in a reverse direction through a filter arrangement (not shown) which is disposed within a filter housing 126.

The filter backflushing system 120 includes a feed pipe 128 for directing contaminated fluid into the filter housing 126, an accepts port 130 for removing filtered fluid from the filter backflushing system 120, and a drain port 132 for purging backflushing fluid from the filter housing 126. The backflushing fluid chamber 124 is supplied with filtered fluid through a backflush fluid input feed 134. During a backflushing procedure, as described in greater detail hereinbelow, the filtered fluid contained within the backflushing fluid chamber 124 is propelled by the backflush piston arrangement 122 into the filter housing 126 through a backflush fluid output feed 138. As shown in FIG. 4, the backflushing fluid chamber 124 includes a single input/output port 139. A plurality of control valves, including a feed valve 140, an accepts valve 142, a drain valve 144 and a backflush valve 146 are utilized to control the flow of fluid through the filter backflushing system 120.

A supply of compressed air or other suitable gas is utilized to displace the backflush piston arrangement 122 during a backflushing procedure. The compressed air is supplied by a compressed air system 150 including an air input feed 152, a pressure intensifier 154 for increasing the pressure of the air supplied through the air input feed 152, and a check valve 156 arranged in parallel with the pressure intensifier 154. The compressed air exits the compressed air system 150 through an air output port 158 and is suitably directed to the backflush piston arrangement 122. A three-way control valve 160 is provided to control the flow of air into the pressure intensifier 154, and to bleed the compressed air to the atmosphere after backflushing.

A differential pressure switch 164 is utilized to determine the differential pressure across the filter arrangement, between the input and output of the filter housing 126. When the differential pressure across the filter arrangement reaches a predetermined threshold, a backflushing procedure is initiated.

In response to a backflushing initiation signal, the backflushing valve 146 is opened after the accepts valve 142 has been closed. As should be readily apparent from FIG. 4, the filtered fluid exiting the filter housing 126 is now supplied to the backflushing fluid chamber 124 through the backflush fluid input feed 138.

After the backflushing fluid chamber 124 has been filled with the filtered fluid to an appropriate, application specific, level, the feed and backflushing valves 140, 146 are closed. Pressurized air is then supplied to the backflush piston arrangement 122 by the compressed air system 150, thereby pressurizing the filter backflushing system 120. In response to the subsequent opening of the drain and backflush output valves 144, 148, the pressurized, filtered fluid contained within the backflushing fluid chamber 124 is rapidly propelled in a reverse direction through the filter housing 126 (and filter arrangement), eventually passing out of the filter backflushing system 120 through the drain port 132. Finally, the backflush output and drain valves 148, 144 are closed, and the feed and accepts valves 140, 142 are reopened, thereby completing the backflushing procedure and returning the filtering system to a filtering operation.

Figure 5:
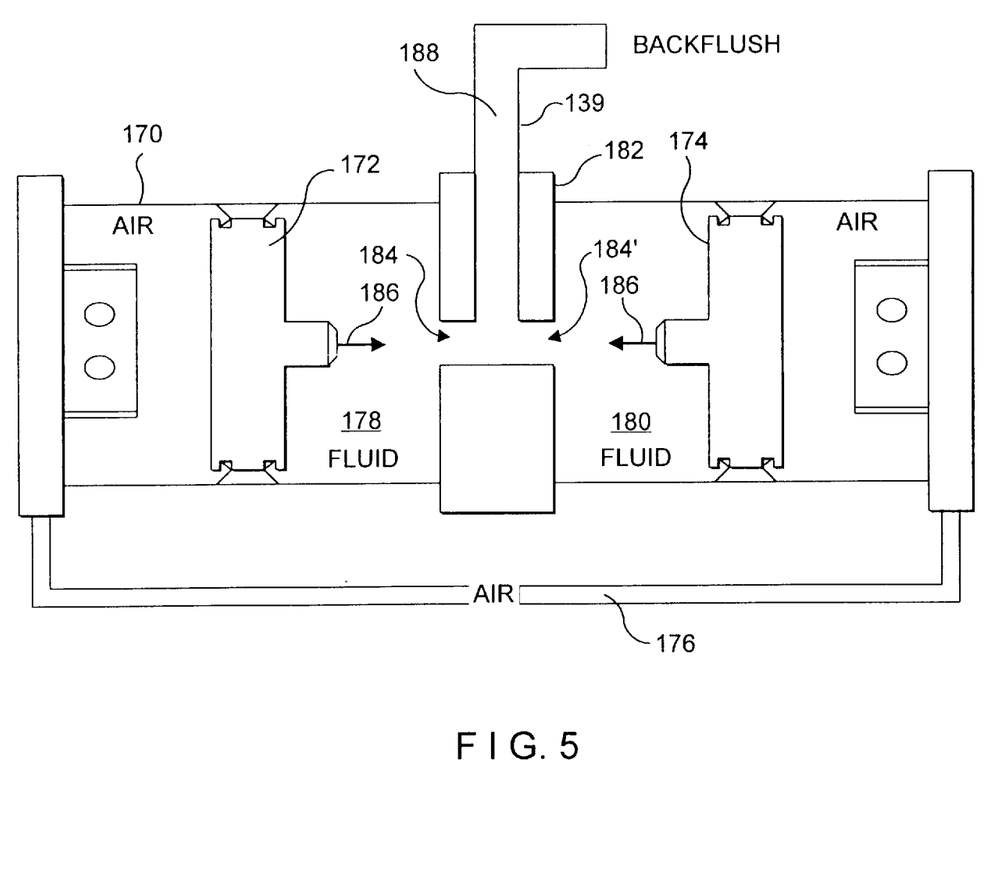
FIG. 5 illustrates a backflushing piston arrangement incorporating a pair of opposing pistons.

A backflushing fluid chamber 170, incorporating a pair of oppositely directed, longitudinally displaceable pistons 172, 174, each pneumatically actuated via a compressed air supply 176, is illustrated in FIG. 5. Although the dual-piston arrangement shown in FIG. 5 is specifically designed for use with the filter backflushing system 120 illustrated in FIG. 4, it may be utilized in conjunction with any of the filter backflushing systems described above, or in conjunction with other currently available filter backflushing systems. The backflushing fluid chamber 170 includes first and second main chambers 178, 180, each containing a quantity of a filtered fluid supplied through input/output port 139, and a fluid outlet 182 for directing a high intensity, high pressure flow of the filtered fluid contained within the first and second main chambers 178, 180 into and through the filter housing 126 during a backflushing procedure. The fluid outlet 182 includes first and second channels 184, 184' for simultaneously receiving the filtered water from the first and second main chambers 178, 180 as the pistons 172, 174, respectively, are displaced toward each other. The filtered fluid is highly pressurized by the oppositely directed longitudinal displacement of the pistons 172, 174 (directional arrows 186), as high pressure compressed air is forced into the backflushing fluid chamber 170. The filtered fluid in the first and second channels 184, 184' is further pressurized as it is simultaneously propelled into a single outlet channel 188, finally escaping from the backflushing fluid chamber 170 through input/output port 139.

The foregoing description of the preferred embodiments of the invention has been presented for purposes of illustration and description. It is not intended to be exhaustive or to limit the invention to the precise form disclosed, and obviously many modifications and variations are possible in light of the above teaching. For example, the present invention may be utilized to sequentially backflush each of the individual filter units in a multiple filter system. Such modifications and variations that may be apparent to a person skilled in the art are intended to be included within the scope of this invention as defined by the accompanying claims.

I claim:

1. A filter backflushing apparatus comprising:

a filtering system including a filter housing containing a filter arrangement therein, said filtering system including an input feed for introducing an unfiltered fluid into said filter housing, an output feed for removing filtered fluid from said filter housing, and a drain output for removing a backflushing fluid; and a piston chamber having an input port for receiving the filtered fluid from the output feed of said filtering system, and a backflushing piston arrangement for propelling the filtered fluid contained within said piston chamber out of said input port of said piston chamber, into said output feed of said filtering system, into said filter housing, through said filter arrangement and out through said drain output, thereby backflushing said filter arrangement during a backflushing operation;

said backflushing piston arrangement including first and second piston members, and an actuating system for displacing said first and second piston members during said backflushing operation;

wherein said piston chamber includes first and second chambers, each having a first diameter, and wherein said first and second piston members are displaceable within said first and second chambers, respectively, wherein said piston chamber further includes a fluid channel for connecting said first and second chambers, said fluid channel having a diameter smaller than the diameter of said first and second chambers.

2. The filter backflushing apparatus according to claim 1, wherein said piston chamber further includes an outlet for directing filtered fluid from said fluid channel into the output feed of said filtering system.

3. A filter backflushing apparatus comprising:

a filtering system including a filter housing containing a filter arrangement therein, said filtering system including an input feed for introducing an unfiltered fluid into said filter housing, an output feed for removing filtered fluid from said filter housing and a drain output for removing a backflushing fluid;

a backflushing fluid chamber having an input port for receiving the filtered fluid from the output feed of said filtering system; and a backflushing arrangement for propelling the filtered fluid contained within said backflushing fluid chamber, during a backflushing operation, out of said input port of said backflushing fluid chamber, into said output feed of said filtering system, into said filter housing, through said filter arrangement and out through said drain output, thereby backflushing said filter member;

said backflushing arrangement including a piston chamber, first and second piston members displaceable within said piston chamber, and an actuating system for displacing said first and second piston members during said backflushing operation;

wherein said piston chamber includes first and second chambers, each having a first diameter, and wherein said first and second piston members are displaceable within said first and second chambers, respectively;

wherein said piston chamber further includes a fluid channel for connecting said first and second chambers, said fluid channel having a diameter substantially smaller than the diameter of said first and second chambers.

4. The filter backflushing apparatus according to claim 3, wherein said piston chamber further includes an outlet for directing filtered fluid from said fluid channel into the output feed of said filtering system.

* * * * *